(12) United States Patent
Andersson

(10) Patent No.: US 12,274,368 B2
(45) Date of Patent: Apr. 15, 2025

(54) UPHOLSTERED COMFORT MEMBER

(71) Applicant: Inter IKEA Systems B.V., LN Delft (NL)

(72) Inventor: Fredrik Andersson, Färlöv (SE)

(73) Assignee: Inter IKEA Systems B.V., LN Delft (NL)

( * ) Notice: Subject to any disclaimer, the term of this patent is extended or adjusted under 35 U.S.C. 154(b) by 0 days.

(21) Appl. No.: 17/762,903

(22) PCT Filed: Sep. 24, 2020

(86) PCT No.: PCT/SE2020/050897
§ 371 (c)(1),
(2) Date: Mar. 23, 2022

(87) PCT Pub. No.: WO2021/061041
PCT Pub. Date: Apr. 1, 2021

(65) Prior Publication Data
US 2022/0330710 A1    Oct. 20, 2022

(30) Foreign Application Priority Data
Sep. 24, 2019    (SE) .................... 1951072-6

(51) Int. Cl.
*A47C 27/12*    (2006.01)
*A47C 31/00*    (2006.01)
(52) U.S. Cl.
CPC ............ *A47C 27/12* (2013.01); *A47C 31/001* (2013.01)

(58) Field of Classification Search
CPC ......... A47C 27/12; A47C 31/001; A47C 7/24; B32B 5/08; B32B 2250/05;
(Continued)

(56) References Cited

U.S. PATENT DOCUMENTS

| 2,398,159 A | 4/1946 | Riehl |
| 2,837,455 A | 6/1958 | Wolf |

(Continued)

FOREIGN PATENT DOCUMENTS

| CH | 709109 A2 | 7/2015 |
| CN | 101076268 A | 11/2007 |

(Continued)

OTHER PUBLICATIONS

International Search Report and Written Opinion for related International Application No. PCT/SE2020/050897 mailed Nov. 24, 2020.

(Continued)

*Primary Examiner* — Brian Handville
(74) *Attorney, Agent, or Firm* — Renner, Otto, Boisselle & Sklar, LLP

(57) ABSTRACT

An upholstered comfort member, comprising a resilient comfort material and a cover fabric. The resilient comfort material comprises lignocellulosic fibres, which provides resilient properties to the resilient comfort material, and a binder at a concentration of between 1 and 30 wt %. The binder binds the lignocellulosic fibres together. The invention further relates to a method for manufacturing of such an upholstered comfort member.

20 Claims, 4 Drawing Sheets

(58) Field of Classification Search
CPC ...... B32B 2262/0276; B32B 2262/062; B32B 5/26; B32B 21/10; B32B 21/14; B32B 27/12; B32B 2250/03; B32B 2260/021; B32B 2260/046; B32B 2262/065; B32B 2262/067; B32B 5/022; B32B 21/02; B32B 21/08; B32B 27/32; B32B 2262/0253; B32B 2262/12; B32B 2307/3065; B32B 2307/50; B32B 2307/72; B32B 2307/732; B32B 2479/00; B32B 2601/00; B32B 5/024; D01F 8/06; B68G 5/00; B68G 11/02; B68G 11/04
See application file for complete search history.

(56) References Cited

U.S. PATENT DOCUMENTS

| | | | |
|---|---|---|---|
| 4,886,697 | A | 12/1989 | Perdelwitz, Jr. et al. |
| 5,061,538 | A | 10/1991 | Hendrix et al. |
| 2004/0242105 | A1 | 12/2004 | McGuire |
| 2004/0242108 | A1 | 12/2004 | Russell et al. |
| 2008/0153373 | A1* | 6/2008 | Hall .......................... B32B 5/26 442/148 |
| 2011/0070420 | A1 | 3/2011 | Lim et al. |
| 2013/0022805 | A1* | 1/2013 | Small, Jr. ............. D04B 21/165 428/220 |
| 2017/0182736 | A1* | 6/2017 | Bergner ................. D04H 1/559 |
| 2017/0354264 | A1* | 12/2017 | Winer ................. A47C 19/202 |

FOREIGN PATENT DOCUMENTS

| | | |
|---|---|---|
| CN | 104842840 A | 8/2015 |
| CN | 106573452 A | 4/2017 |
| GB | 521034 A | 5/1940 |
| GB | 795921 A | 6/1958 |
| GB | 1479623 A | 7/1977 |
| RU | 147772 U1 | 11/2014 |
| UA | 46499 U | 12/2009 |
| WO | 2006/044309 A2 | 4/2006 |
| WO | 2015177267 A1 | 11/2015 |
| WO | 2017084721 A1 | 5/2017 |

OTHER PUBLICATIONS

First Office Action issued Jul. 27, 2023, for corresponding Chinese Patent Application No. 202080065253.0.

\* cited by examiner

UPHOLSTERED COMFORT MEMBER

This application is a national phase of International Application No. PCT/SE2020/050897 filed 24 Sep. 2020, which claims priority to Sweden Application No. 1951072-6 filed 24 Sep. 2019, the entire disclosures of which are hereby incorporated by reference.

FIELD OF THE INVENTION

The present invention relates to an upholstered furniture member, such as a head board of a bed or a seat or a back of a chair, comprising a comfort material.

Further the invention relates to the use of said comfort material in upholstered furniture parts, cushions or mattresses.

BACKGROUND

In upholstered furniture, comfort materials are used for providing a comfortable layer outside an inner, often rigid, structure of the furniture. A cover layer, usually made of fabric, is thereafter attached covering the resilient comfort material. The cover layer may form the outside of the furniture being visible to the user. Alternatively it may be further covered with a liner and an exterior layer to protect it further.

Upholstered furniture commonly uses a carded nonwoven, often described as wadding or batting, on top of a main comfort material for improving comfort parameters. In most cases, this carded wadding consists of carded, bonded fibres of thermoplastic polyesters. Typically, the wadding comprises a blend of two different kinds of fibres where one of them, a core-sheath binder fibre, has a core-sheath configuration with a co-polymerized sheath with a significantly lower melting point compared to the core. The binder fibre serves to bond the fibres into a nonwoven.

Usually, the main comfort material includes cellular polymeric foams, such as a polyurethane (PU) foam. The PU-foam provides comfort and is commercially available. Hence, it is cheap and abundant.

However, synthetic comfort materials, such as polyurethane foam, are typically flammable and not environmentally friendly. In addition, the synthetic main comfort material is often used together with additional non-biodegradable materials, such as thermoplastics. Furthermore, urethane foams generate toxic gas upon combustion and are difficult to recycle in general. Moreover, several comfort material involve animal based products, such as goose down, which are less desired given their origin.

Thus, there is a need for a cheap, less flammable and more environmentally friendly comfort material for upholstered furniture, cushions and mattresses.

SUMMARY

Consequently, the present invention seeks to mitigate, alleviate, eliminate or circumvent one or more of the above identified deficiencies in the art and disadvantages singly or in any combination by providing, according to a first aspect, an upholstered comfort member, comprising a resilient comfort material, and a cover fabric. The resilient comfort material comprises lignocellulosic fibres, which provides resilient properties to the resilient comfort material, and a binder at a concentration of between 1 and 30 wt %. The binder binds the lignocellulosic fibres together.

The resilient comfort material comprising lignocellulosic fibres and a binder may be a type of wood fibre based board, which is commonly used as indoor insulation in e.g. walls of a building. However, the inventor has surprisingly found that such insulation boards also may be used as a resilient comfort material in an upholstered comfort member. The resilient comfort material disclosed herein is commercially available, and thus abundant and cheap, easy to use. Further, it is more environmentally friendly than other comfort materials available on the market. Since the resilient comfort material is available on the market, the manufacturing of the upholstered comfort member is facilitated and the process becomes less time consuming, and hence also cheaper.

The resilient comfort material is light. The resilient comfort material may have a density of between 10 and 100 kg/m$^3$. Preferably, the density is between 30 and 100 kg/m$^3$, such as between 25 and 50 kg/m$^3$, and most preferred the density is about 40 kg/m$^3$. Further, the resilient comfort material is flexible and soft, making it possible to be cut with a simple knife or other cutting tool. The texture of the resilient comfort material is somewhat spongy and it springs back to its original shape if an applied pressure is released. The lignocellulosic fibres and binder of the resilient comfort material together form a wool like material. These properties enable the resilient comfort material to be used in various furniture parts, such as a headboard of a bed or a chair seat.

In a second embodiment, there is provided an upholstered comfort member wherein the lignocellulosic fibres are wood fibres.

In another embodiment, there is provided an upholstered comfort member wherein the binder is present at a concentration from 3 to 20 wt %, preferably 4 to 16 wt %, in the resilient comfort material. The low concentration of the binder is advantageous since the upholstered comfort material comprises less plastic elements, and therefore becomes easier to recycle and is more environmentally friendly. By binding the wood fibres together using a binder, the material reverts to its initial shape rather being deformed if an applied pressure is removed. Further, the binder may provide resilient properties to the resilient comfort material in itself. The fibres in the upholstered comfort member may be present at a concentration of between 70 and 99 wt %, preferably between 80 and 97 wt % and most preferred between 84 and 96 wt %. A high concentration of lignocellulosic fibres is beneficial since these fibres are biodegradable and cheap. In addition, they allow for the formation of the resilient comfort material comprising a low amount of binder having the advantageous properties such as flexibility, low density and softness.

In one embodiment, the binder comprises a thermoplastic material.

In another embodiment, the binder is a bi-component binder fibre.

In yet an embodiment, the resilient comfort material comprises a flame retardant agent.

In a further embodiment, the flame retardant agent is selected from the group consisting of an organic or inorganic compound comprising sulphur, bromine, chlorine, phosphorous, nitrogen, aluminium and/or magnesium; a metal compound; a mineral; and/or a bromine and/or an ammonium or carboxylic salt; or a combination thereof. Preferably the flame retardant is ammonium sulphate.

In another embodiment, there is provided an upholstered comfort member according to any one of the preceding claims, wherein the resilient comfort material has a thickness T of about 5 to 100 mm. Preferably, the thickness T is between about 20 and 60 mm.

In another embodiment, there is provided an upholstered comfort member wherein the upholstered comfort member is an upholstered furniture member. The upholstered furniture member further comprises a base part. Preferably, the upholstered furniture member is a headboard of a bed, a back seat, an arm rest, or a cushion seat. The base part may consist of a solid wood board, a plywood board, an Oriented strand board (OSB), a particle board (also known as low density board), an HDF (high density board), or an MDF (medium density board).

In one embodiment, the upholstered comfort member is a mattress or a cushion.

In another embodiment, the cover material is fabric. The fabric may be a woven or non-woven fabric. The fabric may comprise fibres of cotton, hemp, linen and/or polyester.

In one embodiment, the upholstered comfort member further comprises a liner, the liner being arranged, at least partly, over the cover material. Preferably, the liner is arranged between the cover material and an outer fabric.

According to a second aspect, there is provided the use of a resilient comfort material in an upholstered comfort member. The resilient comfort material comprises lingocellulosic fibres which provide resilient properties to the resilient comfort material, and a binder at a concentration of between 1 and 30 wt %. The binder binds the lingocellulosic fibres together. The upholstered comfort member may be for instance a headboard of a bed, a back seat, a cushion seat, an arm rest, a mattress or a cushion.

In one embodiment, the resilient comfort material has a density of between 10 and 100 kg/m$^3$, preferably between 30 and 100 kg/m$^3$, such as between 25 and 50 kg/m$^3$, and most preferred about 40 kg/m$^3$.

In another embodiment, the lignocellulosic fibres are wood fibres.

In a further embodiment, the binder is present at a concentration of between 2 and 20 wt % in the resilient comfort material. Preferably, the binder is present at a concentration of between 3 to 7 wt %, in the resilient comfort material.

In yet another embodiment, the resilient comfort material comprises, e.g. is impregnated with, a flame retardant agent. Preferably, the flame retardant agent is selected from the group consisting an organic or inorganic compound comprising sulphur, bromine, chlorine, phosphorous, nitrogen, aluminium and/or magnesium; a metal compound; a mineral; and/or a bromine and/or an ammonium or carboxylic salt; or a combination thereof. Preferably, the flame retardant is ammonium sulphate.

According to a third aspect, there is provided a method for manufacturing of an upholstered comfort member as disclosed herein above. The method comprises the steps of providing a resilient comfort material, optionally cutting the resilient comfort material into a piece of resilient comfort material having a desired shape and size, and covering, at least partly, the piece of resilient comfort material using a cover material.

In one embodiment, the method further comprises the step of arranging the optionally cut piece of resilient comfort material on a base part before the step of upholstering.

In another embodiment, the method further comprises the step of applying a liner onto the cover material.

In yet another embodiment, the method further comprises the step of applying an outer fabric onto the cover material, or the liner, if present.

According to a fourth aspect, there is provided a resilient comfort material comprising lignocellulosic fibres providing resilient properties to the resilient comfort material, and a binder at a concentration of between 1 and 30 wt %. The binder binds the lignocellulosic fibres together and the binder is a bi-component binder fibre.

According to a fifth aspect, there is provided a method for manufacturing a resilient comfort material comprising lignocellulosic fibres providing resilient properties to the resilient comfort material, and a binder at a concentration of between 1 and 30 wt %. The binder binds the lignocellulosic fibres together and the binder is a bi-component binder fibre. The method comprises the steps of determining the concentration of the binder in relation to the lignocellulosic fibre, mixing the desired amount of lignocellulosic fibres and the binder, whereby a mixture of lignocellulosic fibres and binder is obtained, placing the mixture on a transport device, transporting the mixture through a roller into an oven, subjecting the mixture to heat in the oven such that the binder partly melts and binds the lignocellulosic fibres together, and extracting the formed resilient comfort material from the oven.

In one embodiment, the step of mixing the desired amount of lignocellulosic fibres and the binder is conducted in an aerated drum in a plurality of sequences.

In another embodiment, the step of subjecting the mixture to heat further comprises adjusting the height of the mixture soon to be the resilient comfort material with rollers in the oven.

In yet another embodiment, the method further comprises a step of cutting the formed resilient comfort material into predetermined shapes, lengths and/or sheets.

The method may further comprise wounding the resilient comfort material onto a roll.

Further advantageous features of the invention are elaborated in embodiments disclosed herein. In addition, advantageous features of the invention are defined in the dependent claims.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DETAILED EMBODIMENTS

The term "upholstered comfort member" as used in the present application relates to any comfort member having upholstery. Hence, in this term is included various parts, such as armrests, seating areas, back rests and frames, of seating furniture, such as sofas, armchairs, dining chairs, office chairs etc. Furthermore, "upholstered comfort member" also includes other comfort members having upholstery, such as bed frames, headboards of beds, mattresses and cushions.

As will be described in the following, improved upholstered furniture members will be described as well as a method for providing such furniture members.

Figure 1A:
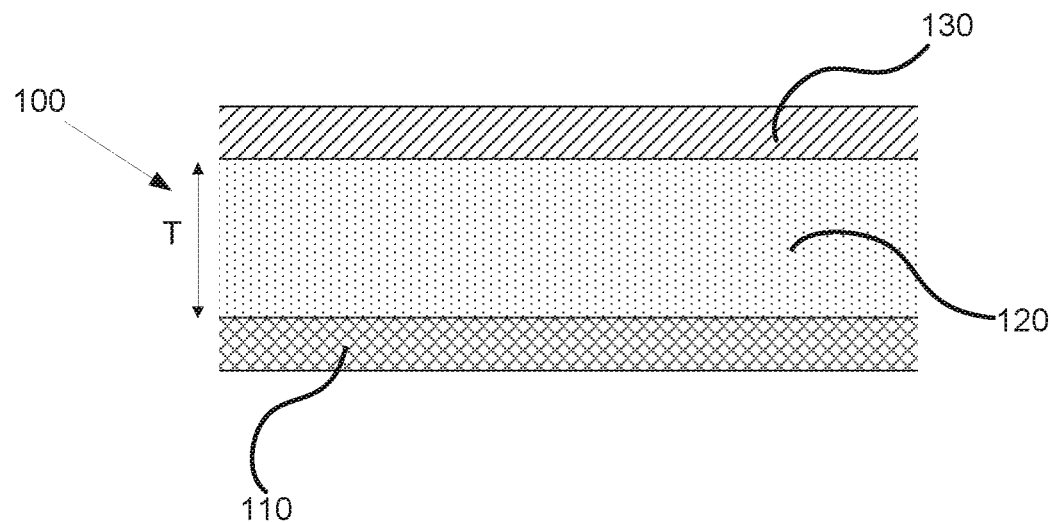
FIG. 1a depicts a cross-section of an upholstered comfort member.

With reference to FIG. 1a, an upholstered comfort member 100 is shown. The upholstered comfort member 100 comprises several layers being a base part 110, a resilient comfort material 120 and a cover material 130. The scale of the different layers in FIG. 1a is not accurate.

Figure 1B:
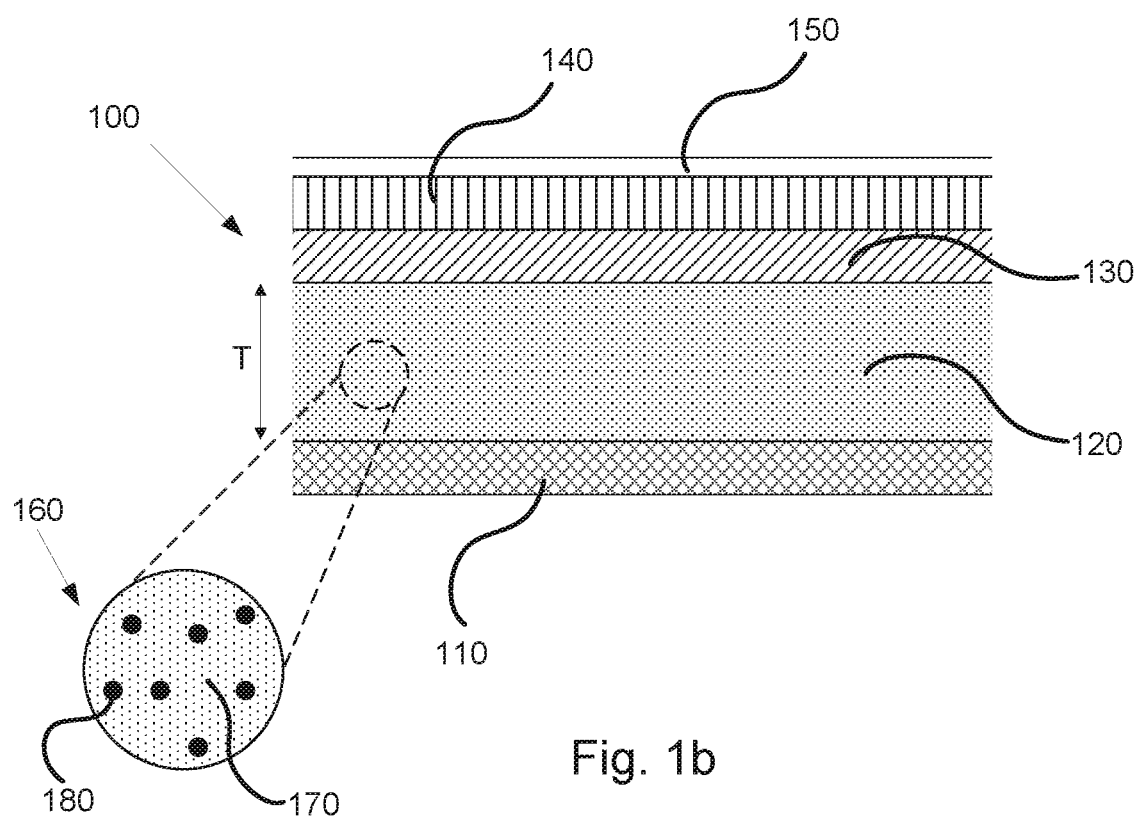
FIG. 1b depicts a cross-section of an upholstered comfort member according to a second embodiment.

FIG. 1b shows another embodiment of an upholstered comfort member 100. The upholstered comfort member 100 in FIG. 1b also comprises the base part 110, the resilient comfort material 120 and the cover material 130. In addition, upholstered comfort member 100 in FIG. 1b comprises a liner 140 and an outer fabric 150. Neither the scale of the different layers in FIG. 1b is accurate. An enlarged portion of the resilient comfort material 120 is shown in the circle 160. The resilient comfort material 120 comprises fibres 170 and a binder fibre 180.

The base part 110 may be a board. The base part 110 is preferably made of a rigid material, such as a particleboard, a fibreboard, a plywood board, or a wood board.

The resilient comfort material 120 is resilient and flexible such that its shape may be adapted to various dimensions. In addition, the resilient comfort material 120 is cuttable into any desired shape. The cutting can be performed using for instance a knife, a saw, a pair of scissors or any other suitable cutting utensil.

Commonly, the resilient comfort material 120 is applied to a structural body, i.e. the base part 110, of the piece of furniture. The resilient comfort material 120 has a thickness T being in the range of between 5 and 100 mm, preferably between 10 and 80 mm and most preferred about 20 to 60 mm. The thickness T may vary within the specified range over the extension of the resilient comfort material. Optionally, the resilient comfort material 120 originates from a thicker slab of resilient comfort material (not shown) having a thickness of for instance 45 mm or 200 mm to form a slab of the resilient comfort material 120 of the thickness T.

The resilient comfort material 120 comprises cellulosic fibres, such as lignocellulosic fibres 170, which preferably are wood fibres (such as Spruce wood fibres, Pinewood fibres, Aspen wood fibres, or Birch wood fibres). Alternatively, the lignocellulosic fibres 170 are plant fibres, such as baste fibers, e.g. hemp, jute, or flax, or fruit fibers, e.g. coconut fibres, pulp fibres, such as paper fibres, or fibres from recycled particle boards.

The wood, hemp or coconut fibres are preferable since they are easy to recycle and thus environmentally friendly. The wood fibres may be harvested from young trees, which have different properties than the timber of older trees. This is also advantageous for the environment, since there is a large portion of young forest which is not made use of Instead, the material of the young forest is simply burnt after clearing of the young forest area.

Moreover, hemp and coconut fibres are abundant and have a reasonable pricing such that the production of the resilient comfort material 120 becomes cost effective.

The wood fibres may have a length L in the range of about 1-50 mm, preferably between 6-25 mm. The length may have impact on how soft or rigid the fibre is experienced and how durable the fibre is. A metal wire cloth sieve of a specific width (i.e. between 1 and 50 mm) may be used to determine the size of the lignocellulosic fibres 170, such that for instance 95% of the lignocellulosic fibres 170 pass through the width of the sieve and thus have a size smaller than the width of the sieve. Applicable standards are to ISO 3310-1:2016 and ISO 2591-1:1988.

According to an embodiment, at least 95% of the wood fibers passes through a metal wire cloth sieve width of 25 mm, according to ISO 3310-1:2016 and ISO 2591-1:1988. Further, not more than 5 wt. %, such as not more than 10 wt. % of the wood fibers passes through a metal wire cloth sieve width of 6 mm, according to ISO 3310-1:2016 and ISO 2591-1:1988

Additionally, the resilient comfort material 120 comprises a binder 180. The binder 180 serves to binding the wood fibres together and to provide flexibility in the material. By binding the wood fibres together, the material reverts to its initial shape rather than being deformed if an applied pressure is removed. Preferably, the binder is a binder fibre. According to a less preferred embodiment, the binder is a resin or a particulate thermoplastic. Though a resin may be used in providing a resilient comfort material 120, it provides a less flexible and less resilient comfort material. Similar disadvantages apply to a particulate thermoplastic.

A binder fibre is preferred, as less binder is required to provide the resilient comfort material 120. A single binder fibre may bind to several lignocellulosic fibres 170 of the resilient comfort material 120. In addition, the active surface area per volume unit is much higher for a fibre compared to a particle. Further, the binder fibre may provide resilient properties in itself.

The binder 180 may be a thermoplastic binder selected from the group consisting of particulate polypropylene (PP), particulate polyethylene (PE), a bi-component binder fibre (bico binder fibre), or a combination thereof. The bico binder fibre represents a preferred binder.

The bico binder fibre may be a core/sheath fibre or a side-by-side type fibre. Typically, the binder fibre is core/sheath fibre. Further, the bico binder fibre may be hollow. A bico binder fibre may for instance be a core/sheath fibre comprising a core formed from PP and comprise an outer sheath of PE embedding the core of PP. The core of a bico binder fibre has a higher melting point than the melting point of the outer coating. An advantage with the bico binder fibre is that when the bico binder fibre is heated to effectuate binding, only the outer sheath will melt while the core will remain solid. In this way, the flexibility of the resilient comfort material 120 is improved since the core part of the bico binder fibre is intact.

According to an embodiment, the bico fibre has a linear density in the range 0.5 to 5 dtex, such as in the range 1 to 3 dtex. The linear density may be about 1.3 dtex. Further, the bico fibre may be a staple fiber. Such a staple fiber may be 3 to 10 mm long, such as 5 to 8 mm long. The bico fibre may be about 6 mm long.

Further, the binder fibre may be a crimped fibre providing further resilience. Thus, the binder fibre may be an eccentric bico fibre. A combination of different binder fibres may also be used to affect the resilient properties of the resilient comfort material. In addition to bico binder fibre, a staple fibre, such as bico staple fibre, may be added to adjust the properties of the obtained resilient comfort material 120.

When a bico binder is used as the binder 180, the bico fibre will bind the lignocellulosic fibres 170 together during the thermal formation process. If the resilient comfort material 120 is further processed with heat, the inner core may also melt and contribute to maintaining the obtained desired shape. If the resilient comfort material 120 is not further heat treated, the inner core may provide to additional flexibility and/or solidity, depending on the materials used.

The concentration of the binder 180 in the comfort material 120 is in the range of between 1 and 30 wt %, preferably between 2 and 24 wt %, such as between 3 and 20 wt %. The concentration of the binder 180 in the comfort material 120 may further be between 4 and 16 wt %. By using a bico binder fibre a lower amount of binder may be used.

Resilience and density are properties, which may be affected by the concentration of the binder 180. How much the binder 180 will contribute to the resilience of the resilient comfort material 120 depends on the type of binder and/or binder fibre used. For instance, tests performed by the inventors have shown that a combination of a bico binder fibre and a hollow conjugated binder fibre results in a higher resilience of the resilient comfort material 120 than when using a bico binder fibre in combination with an eccentric bico binder fibre.

Different concentrations of the binder 180 may be preferable for different applications of the resilient comfort material 120. If the application of the comfort material 120 requires lower resilience, a lower concentration of the binder fibre is usually applicable than if the application demands a material of high resilience.

A size of the binder fibre is preferably in the range and close to the size of the lignocellulosic fibres 170 to achieve a satisfactory resilient comfort material 120. An advantage with binder fibres 180 having a small particle size is that a higher number of binder fibres 180 may be used, which results in more binding sites between cellulosic fibres in the resilient comfort material 120.

The resilient comfort material 120 may be a type of "wood fibre wool isolation", for instance a wood fibre isolation wool provided by Hunton, Steico, Gutex, or Pavatex, such as Hunton Nativo, Steico flex, Gutex Thermoflex or Pavatex Pavatherm.

Table 1 shows test results from tests of static and dynamic setting values of polyethylene (PE) foam, polyester VLAP, and resilient comfort material 120 with either a conjugated binder fibre or an eccentric binder fibre as the binder 180, respectively. PE foam and polyester VLAP are comfort materials known in the art. However, these materials are less environmentally friendly than the resilient comfort material 120 disclosed herein, since polyester VLAP and PE foam are synthetic materials manufactured from a non-renewable source of materials.

A low setting value is preferable since it indicates that the resilient comfort material 120 will recover when a static loading is removed. If the setting value ideally equals zero there will be no visible deformation in the comfort material. The setting values shown in Table 1 have been measured using the ISO 3358:2014 to test the permanent deformation after 80 000 cycles.

As shown in Table 1, the resilient comfort materials 120 have setting values of between 38 and 41%, which is lower (and thus better) than for instance the polyester VLAP. The test results indicate that the resilient comfort material 120 has advantageous properties for its intended use as a comfort material.

TABLE 1

| Material | Setting value (%) (ISO 3358: 2014) |
| --- | --- |
| Foam (PE) | 8 |
| Polyester VLAP | 50 |
| Resilient comfort material 120 (comprising conjugated or eccentric bico binder) | 38-41 |

According to an embodiment, about 76 to 92 wt % of the resilient comfort material 120 is comprised of wood fibres which is a sustainable and recyclable material. Hence, the resilient comfort material 120 is much more environmentally friendly than e.g. other synthetic polymer foams used in the art as comfort materials. Moreover, the resilient comfort material 120 may take advantage and be formed from left over materials from e.g. sawmills.

Further, the wood fibres in the comfort material 120 are bio-based and have hygroscopic properties, which may provide advantages for the comfort experience, since natural fibres feel more comfortable adjacent to the human body has sufficient water vapour permeability. Thus, wood fibres having sufficient breathability, i.e. water vapour permeability, lead moisture, e.g. transpiration, away.

The low concentration of the binder 180 allows for a resilient comfort material 120 comprising less plastic elements, which is therefore more environmentally friendly and easier to recycle.

The resilient comfort material 120 may have a density of between 10 and 300 kg/m$^3$, such as between 10 and 100 kg/m$^3$, preferably between 30 and 100 kg/m$^3$, such as between 25 and 50 kg/m$^3$, and most preferred about 40 kg/m$^3$.

Preferably, the resilient comfort material 120 comprises a flame retardant. The flame retardant may be a commercially available flame retardant, such as an organic or inorganic compound comprising sulphur, bromine, chlorine, phosphorous, nitrogen, aluminium and/or magnesium; a metal compound; a mineral; and/or a bromine and/or an ammonium or carboxylic salt; or a combination thereof. The flame retardant may be for instance ammonium sulphate. For instance, the resilient comfort material 120 may be treated with a flame retardant by spraying, soaking or impregnation it with a flame retardant dissolved or dispersed in a liquid. The resilient comfort material 120 may also comprise flame retardant fibres. Flame retardant fibres are known in the art (cf. e.g. WO 2017/084721 A1).

Optionally, the resilient comfort material 120 is slightly compacted, so as to provide a comfort material 120 having enhanced thermal isolation properties. An initially less dense resilient comfort material may be compacted by slightly compressing it under heating to provide a permanently more dense material, i.e. a compacted material. However, according to such an embodiment, the compacted resilient comfort material 120 is still soft and flexible, but its density is less than 300 kg/m$^3$, such as in in the range of between 100 and 200 kg/m$^3$.

The cover material 130 may be a fabric. The fabric may be a woven or non-woven fabric. The fabric may comprise fibres of cotton, hemp, linen and/or polyester. The liner 140 may be a liner 140 as disclosed in WO 2015/177267 A1. The purpose of a liner 140 is to provide protection from wear and tear, and the liner 140 may also facilitate convenient assembly of slip-covers and prevent the comfort material 120 from being deformed during assembly of the outer fabric 150.

The outer fabric 150 faces the exterior of the upholstered comfort member 100 shown in FIG. 1b.

Figure 2:
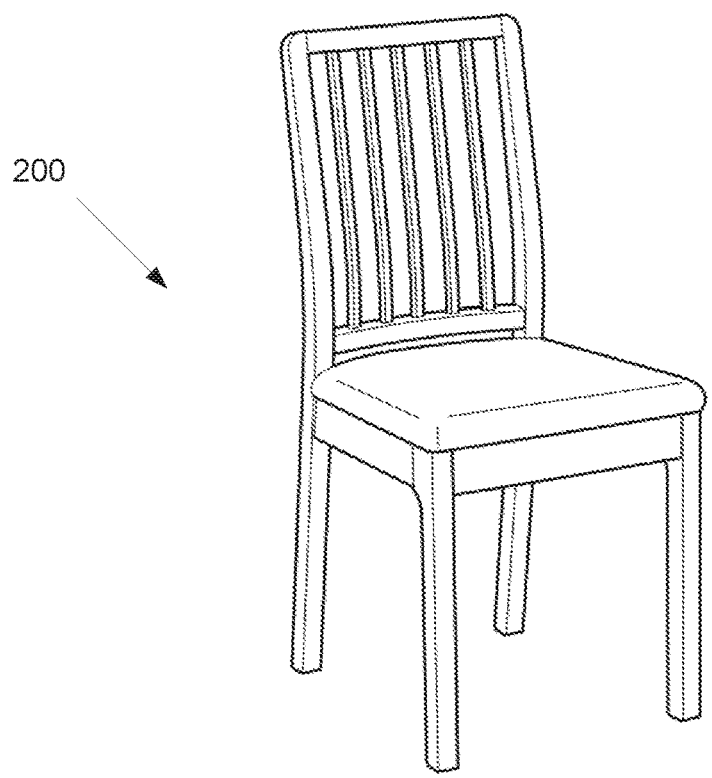
FIG. 2 shows an exemplary embodiment of an upholstered comfort member.

FIG. 2 shows an exemplary embodiment of a chair 200 having an upholstered seat. The seat comprises an upholstered comfort member 100 as disclosed herein.

Figure 3:
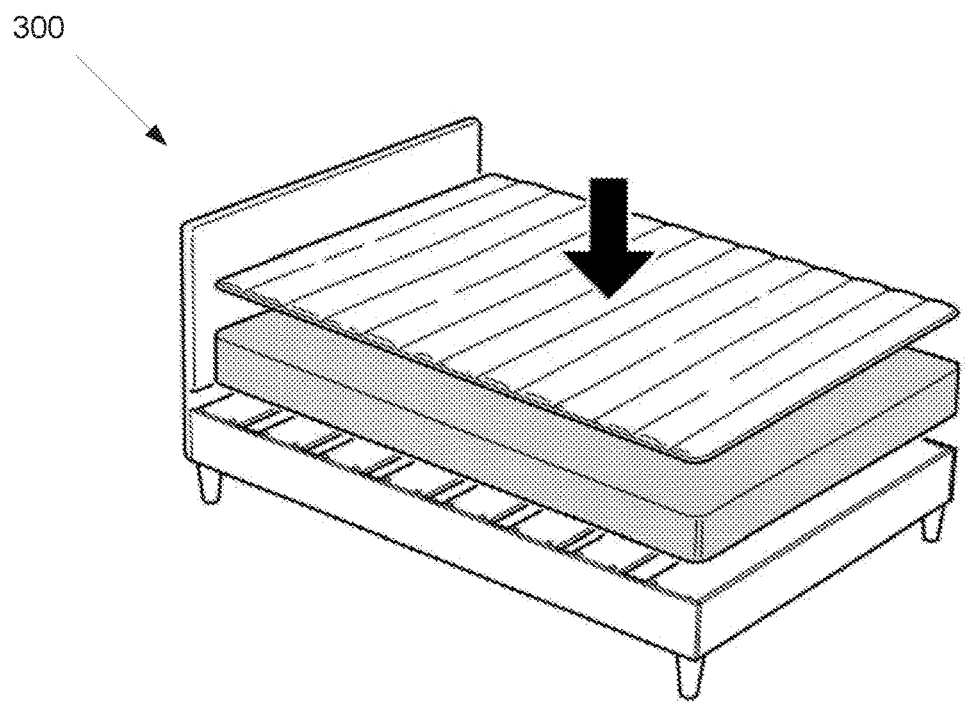
FIG. 3 shows another exemplary embodiment of an upholstered comfort member.
Figure 4:
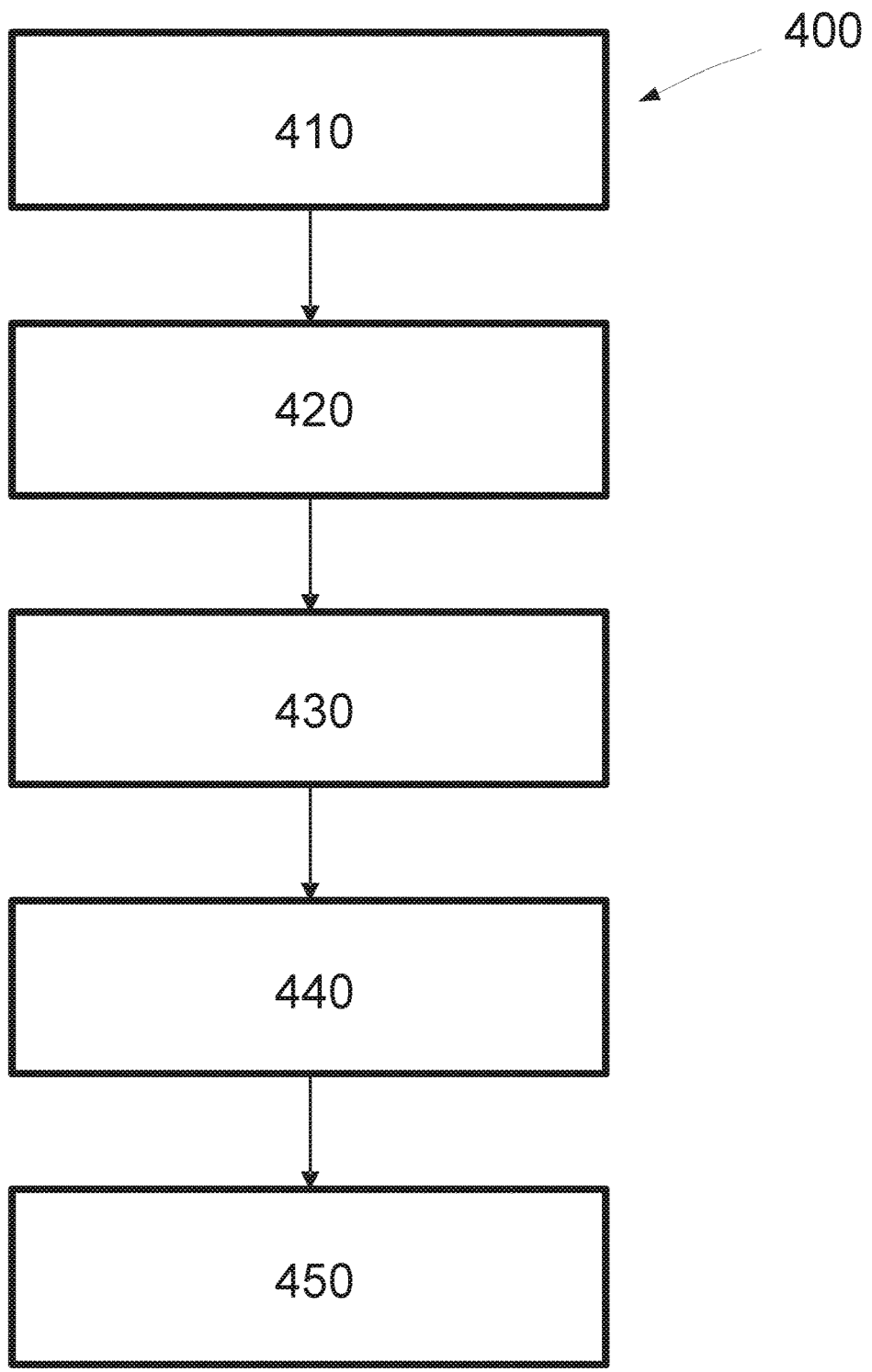
FIG. 4 shows a flow chart for a method for manufacturing an upholstered comfort member.

With reference to FIG. 3, yet another exemplary embodiment is shown. FIG. 3 shows a bed 300 having a mattress comprising an upholstered comfort member 100 according to one embodiment is shown. In FIG. 4, a schematic outline of a method 400 for manufacturing an upholstered comfort member 100 is shown. The method 400 comprises a first step 410 of providing a resilient comfort material 120. In an optionally second step 420 of cutting the resilient comfort material 120, a piece of said comfort material 120 is obtained. The resilient cuttable comfort material 120 can be cut and shaped into any desired size and/or shape, if needed, depending on what upholstered comfort member 100 which is to be manufactured.

In the next step, the piece of resilient comfort material 120 is preferably arranged 430 of a provided base part 110, and is then upholstered 440 inside a cover material 130. The resilient comfort material 120 is placed on an exterior side of the base part 110.

Alternatively, the method 400 further comprises the step of applying 450 a liner 140 onto the cover material 130, as shown in FIG. 1b. Further, the method may also comprise a step of applying 460 an outer fabric 150 onto the cover material 130 or onto the liner 140 as shown in FIG. 1b.

The resilient comfort material 120 is manufactured by firstly determining the concentration of the binder 180 in relation to the lignocellulosic fibre 170. The concentration determination is based on weight. Once determined, the desired amount of lignocellulosic fibres 170 and binder 180, respectively, are mixed in an aerated drum in a plurality of sequences, whereby a mixture of lignocellulosic and binder is obtained.

The mixture is placed on a transport device, e.g. a conveyer belt, with a forming head. The mixture may either fall down onto the conveyor belt or be blown onto the conveyor belt. The transport device transports the mixture through a roller, into an oven. The roller will determine the height of the finished resilient comfort material 120.

The oven subjects the mixture to heat such that the binder in the mixture partly melts and binds the lignocellulosic fibres together. Optionally, the oven blows heat from one or more directions through the mixture such that the binder 180 at least partly melts and forms a matrix together with the lignocellulosic fibres 170. Heat blown from one or more directions provides efficient heating and an even heat distribution throughout the material to be formed. Optionally, this step may also comprise rollers which adjust the height of mixture soon to be the resilient comfort material 120.

The bonded resilient comfort material 120 is extracted from the oven in the shape of a large mat or mattress, which may be cut to predetermined shapes, lengths and/or sheets. Optionally, the resilient comfort material 120 may be wound onto a roll.

In this method, the binder 180 used is preferably a dry binder 180, thus decreasing the number of steps used in the formation process compared to when using liquid binders.

Hence, the resilient comfort material 120 disclosed herein comprises lignocellulosic fibres 170 providing resilient properties to the resilient comfort material 120, and a binder 180 at a concentration of between 1 and 30 wt %, such as between 8 and 24 wt %. The binder 180 binds the lignocellulosic fibres 170 together and is preferably a bico binder fibre. Moreover, the binder 180 may also contribute to the resilience of the resilient comfort material 120. The bico binder fibre may be an eccentric or concentric core-sheath binder fibre or an eccentric side-by-side binder fibre. Optionally, the bico binder fibre is crimped. The lignocellulosic fibres 170 may be wood fibres, such as wood fibres from Spruce, Pinewood, Aspen, or Birch and the fibres may have a length L in the range of about 1-50 mm, preferably between 6-25 mm.

Figure 5A:
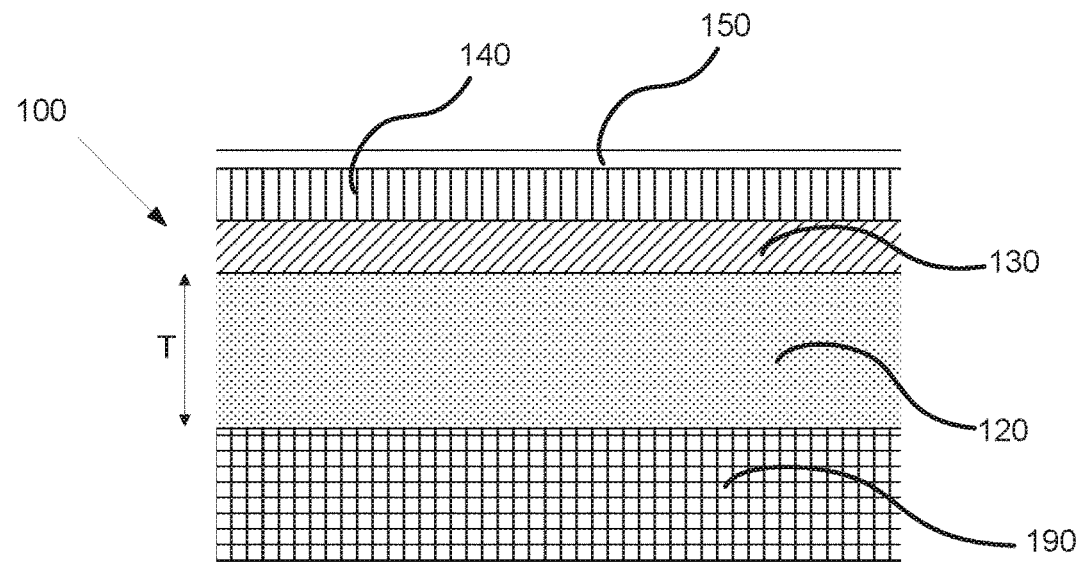
FIG. 5a depicts a cross-section of an upholstered comfort member according to a third embodiment.

Optionally, the resilient comfort material 120 is combined with metal springs or spring coils, for instance bonnell springs or pocket springs 190, as shown in FIG. 5a. The resilient comfort material 120 is arranged on top of a layer of metal spring/spring coils 190, and on top of the resilient comfort material 120 there is provided an optional cover fabric 130, an optional liner 140 and an optional outer fabric 150, as shown also in FIG. 1b.

Figure 5B:
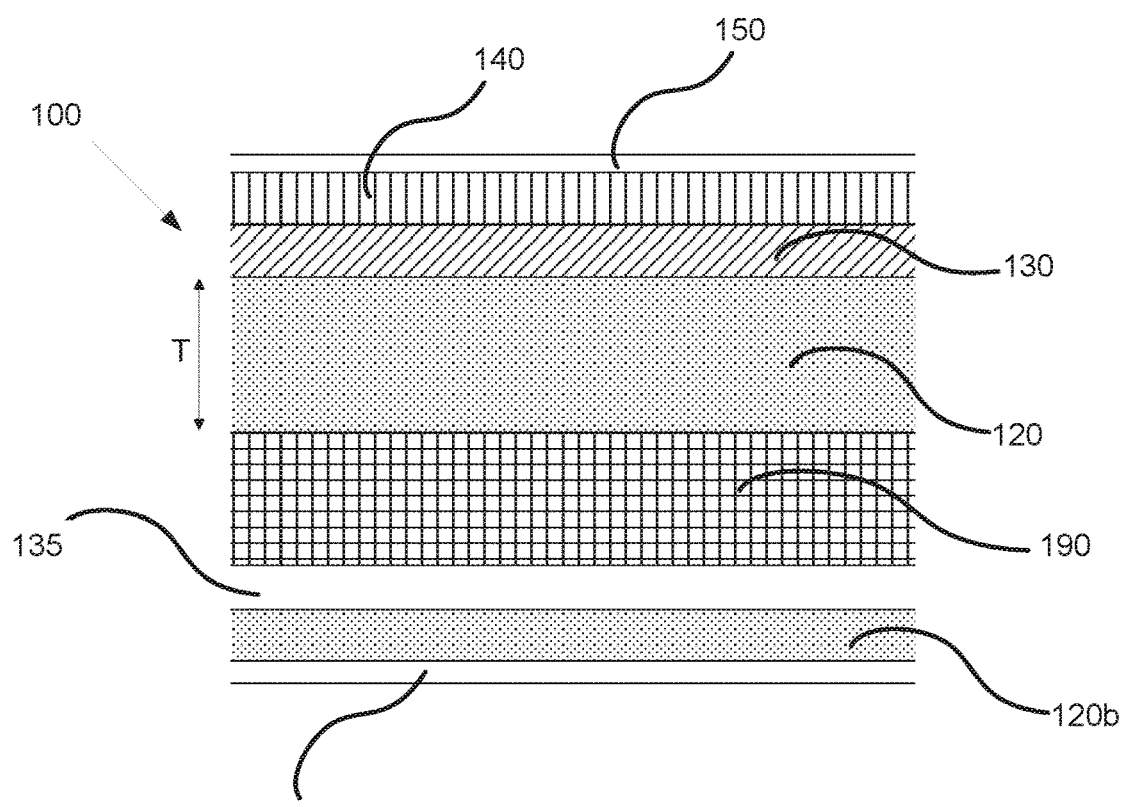
FIG. 5b depicts a cross-section of an upholstered comfort member according to a fourth embodiment.

Further optionally, as shown in FIG. 5b, a cloth 135 being stiffer and less resilient than the resilient comfort material 120 is arranged beneath the springs 190. Such cloth 135 may be a jute cloth. The embodiment shown in FIG. 5b further comprises an additional layer 120b of the resilient comfort material 120 and a second outer fabric 150b.

The comfort material 120 acts as a soft cushioning material on top of the coil springs or springs 190 and will disguise the feeling of metal, and provides additional surface comfort.

Table 2 shows test results from a height loss performance test. The total height loss after 50 000 cycles was measured in percentage for two pillows, comprising the resilient comfort material 120 in combination with pocket springs or with bonnell metal springs. The total height loss was 19% for the pillow comprising the resilient comfort material 120 in combination with pocket springs and 15% for the pillow comprising the resilient comfort material 120 in combination with bonnell metal springs. These results are both within the threshold for an acceptable result and thus fulfil the height loss over time requirements. The test results are also in the same range as the total height loss for conventional materials in the art, such as the polyester VLAP.

TABLE 2

| Resilient comfort material 120 in combination with springs | Total height loss (%) after 50K cycles (corresponding to 10 years use) |
|---|---|
| Pocket springs | 19 |
| Bonnell metal springs | 15 |

Without further elaboration, it is believed that one skilled in the art may, using the preceding description, utilize the present invention to its fullest extent. The preceding preferred specific embodiments are, therefore, to be construed as merely illustrative and not limitative of the disclosure in any way whatsoever.

Although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different than those described above.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous.

In addition, singular references do not exclude a plurality. The terms "a", "an", "first", "second" etc. do not preclude a plurality.

The invention claimed is:

1. An upholstered comfort member, comprising a resilient comfort material, and a cover fabric, wherein the resilient comfort material comprises lignocellulosic fibres providing resilient properties to the resilient comfort material, and a binder, wherein the binder is a bi-component binder fibre comprising a thermoplastic material, at a concentration of between 1 and 30 wt %, the binder binding the lignocellulosic fibres together, and wherein the lignocellulosic fibres have a length of about 1 to 50 mm.

2. The upholstered comfort member according to claim 1, wherein the lignocellulosic fibres are wood fibres.

3. The upholstered comfort member according to claim 1, wherein the binder is present at a concentration from 1 to 20 wt % in the resilient comfort material, and wherein the lignocellulosic fibres are present at a concentration of between 70 and 99 wt %.

4. The upholstered comfort member according to claim 3, wherein the lignocellulosic fibres are present at a concentration of between 80 and 97 wt %.

5. The upholstered comfort member according to claim 1, wherein the resilient comfort material has a density of between 10 and 100 kg/m$^3$.

6. The upholstered comfort member according to claim 1, wherein the resilient comfort material comprises a flame retardant agent.

7. The upholstered comfort member according to claim 1, wherein the resilient comfort material has a thickness T of about 5 to 100 mm.

8. The upholstered comfort member according to claim 1, wherein upholstered comfort member is an upholstered furniture member, the upholstered furniture member further comprising a base, and the upholstered furniture member being a headboard of a bed, a back seat, an arm rest, or a cushion seat.

9. The upholstered comfort member according to claim 8, wherein said base part consists of a solid wood board, a plywood board, an Oriented strand board (OSB), a particle board (also known as low density board), an HDF (high density board), or an MDF (medium density board).

10. The upholstered comfort member according to claim 1, wherein upholstered comfort member is a mattress or a cushion.

11. The upholstered comfort member according to claim 1, further comprising a liner (140), the liner being arranged, at least partly, over the cover material (130), between the cover material (130) and an outer fabric (150).

12. The upholstered comfort member according to claim 1, wherein said upholstered comfort member further comprises a layer of coil or pocket springs arranged adjacent to the resilient comfort material.

13. A method for manufacturing of an upholstered comfort member, wherein the method comprises the steps of:
providing a resilient comfort material according to claim 1;
optionally cutting said resilient comfort material into a piece of resilient comfort material having a desired shape and size; and
covering, at least partly, said piece of resilient comfort material using a cover material.

14. The method according to claim 13, wherein the method further comprises the step of arranging a cut piece of resilient comfort material on a base part before the step of covering said piece of resilient comfort material.

15. The method according to claim 13, wherein the method further comprises the step of applying a liner onto the cover material.

16. The method according to any one of claim 13, wherein the method further comprises the step of applying an outer fabric onto the cover material.

17. The method according to claim 13, wherein a method for manufacturing the resilient comfort material comprises the steps of:
mixing lignocellulosic fibres and bi-component binder fibre, whereby a mixture of lignocellulosic fibres and binder comprising between 1 and 30 wt % of the binder is obtained;
transporting the mixture through a roller into an oven;
subjecting the mixture to heat in the oven such that the binder partly melts and binds the lignocellulosic fibres together; and
extracting the formed resilient comfort material from the oven.

18. The method according to claim 17, wherein the step of mixing the desired amount of lignocellulosic fibres and the binder is conducted in an aerated drum in a plurality of sequences.

19. The method according to claim 17, wherein the step of subjecting the mixture to heat further comprises adjusting the height of the mixture soon to be the resilient comfort material with rollers in the oven.

20. The method according to claim 17, further comprising a step of cutting the formed resilient comfort material into predetermined shapes, lengths and/or sheets.

* * * * *